(12) United States Patent
Marquez Duran

(10) Patent No.: US 10,633,031 B2
(45) Date of Patent: Apr. 28, 2020

(54) B-PILLAR CENTRAL BEAM AND METHOD FOR MANUFACTURING

(71) Applicant: AUTOTECH ENGINEERING S.L., Amorebieta-etxano (ES)

(72) Inventor: Sergi Marquez Duran, Rajadell (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 87 days.

(21) Appl. No.: 15/776,054

(22) PCT Filed: Dec. 16, 2016

(86) PCT No.: PCT/EP2016/081473
§ 371 (c)(1),
(2) Date: May 14, 2018

(87) PCT Pub. No.: WO2017/103138
PCT Pub. Date: Jun. 22, 2017

(65) Prior Publication Data
US 2019/0054958 A1 Feb. 21, 2019

(30) Foreign Application Priority Data
Dec. 18, 2015 (EP) .................................. 15382640

(51) Int. Cl.
*B62D 25/04* (2006.01)
*B62D 29/00* (2006.01)
(Continued)

(52) U.S. Cl.
CPC .......... *B62D 25/04* (2013.01); *B21D 22/022* (2013.01); *B21D 47/01* (2013.01); *B62D 29/007* (2013.01);
(Continued)

(58) Field of Classification Search
CPC .... B62D 25/04; B62D 29/007; B21D 22/022; B21D 47/01; C21D 1/673;
(Continued)

(56) References Cited

U.S. PATENT DOCUMENTS

2014/0191536 A1* 7/2014 Elfwing ................. B62D 25/04
296/193.06
2016/0288840 A1* 10/2016 Valencia Carrio ... B62D 25/025
(Continued)

FOREIGN PATENT DOCUMENTS

| DE | 102005038488 | 2/2007 |
|---|---|---|
| EP | 0816520 | 1/1998 |
| EP | 2006190 | 12/2008 |

OTHER PUBLICATIONS

International Search Report for PCT/EP2016/081473, dated Apr. 10, 2017.

*Primary Examiner* — Lori L Lyjak
(74) *Attorney, Agent, or Firm* — Squire Patton Boggs (US) LLP

(57) ABSTRACT

In a first aspect, a B-pillar central beam made of steel which comprises hard zones and soft zones. Such soft zones have less mechanical strength than the hard zones. The B-pillar central beam further comprises an upper region with a fastening portion for fastening to a roof member, and a lower region with a fastening portion for fastening to a sill member. The B-pillar central beam includes two soft zones. A lower soft zone is located between the lower fastening portion and 50% of the B-pillar central beam height, and an upper soft zone is located between the upper fastening portion and 50% of the B-pillar central beam height. The upper soft zone has higher mechanical strength than the lower soft zone. Methods for manufacturing such B-pillar central beam are also provided.

16 Claims, 8 Drawing Sheets

(51) Int. Cl.
*B21D 22/02* (2006.01)
*B21D 47/01* (2006.01)
*C21D 1/673* (2006.01)
*C22C 38/00* (2006.01)
*C22C 38/02* (2006.01)
*C22C 38/04* (2006.01)
*C22C 38/28* (2006.01)
*C22C 38/32* (2006.01)

(52) U.S. Cl.
CPC ........ *C21D 1/673* (2013.01); *C21D 2211/002* (2013.01); *C21D 2211/005* (2013.01); *C21D 2211/008* (2013.01); *C21D 2211/009* (2013.01); *C21D 2221/00* (2013.01); *C22C 38/001* (2013.01); *C22C 38/002* (2013.01); *C22C 38/02* (2013.01); *C22C 38/04* (2013.01); *C22C 38/28* (2013.01); *C22C 38/32* (2013.01)

(58) Field of Classification Search
CPC ........ C21D 2211/002; C21D 2211/005; C21D 2211/008; C21D 2211/009; C21D 2221/00; C22C 38/001; C22C 38/02; C22C 38/04; C22C 38/28; C22C 38/32
See application file for complete search history.

(56) References Cited

U.S. PATENT DOCUMENTS

| | | | |
|---|---|---|---|
| 2017/0008568 A1* | 1/2017 | Heitkamp | B62D 25/04 |
| 2017/0073017 A1* | 3/2017 | Steffens | B62D 29/00 |
| 2017/0259851 A1* | 9/2017 | Higuchi | B62D 21/15 |
| 2017/0341684 A1* | 11/2017 | Goldyn | B62D 25/04 |
| 2018/0274052 A1* | 9/2018 | Chiriac | C21D 6/004 |

* cited by examiner

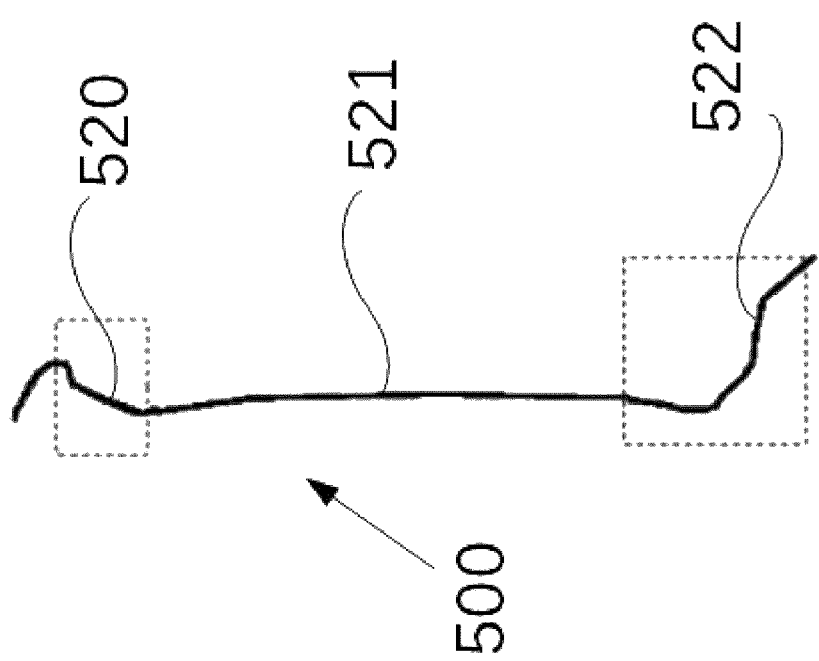

Prior art ns to and claims the benefit
B-PILLAR CENTRAL BEAM AND METHOD FOR MANUFACTURING The present application relates to and claims the benefit and priority to EP 15 382 640.9 filed on Dec. 18, 2015. The present disclosure relates to B-pillars, in particular to B-pillar central beams with soft zones.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars or obstacles.

The structural skeleton of a vehicle, e.g. a car, in this sense may include e.g. a bumper, pillars (A-pillar, B-pillar, C-pillar), side impact beams, a rocker panel, and shock absorbers. For the structural skeleton of a car, or at least for a number of its components, it has become commonplace in the automotive industry to use so-called Ultra-High Strength Steels (UHSS), which exhibit an optimized maximal strength per weight unit and advantageous formability properties. UHSS may have an ultimate tensile strength of at least 1000 MPa, preferably approximately 1500 MPa or up to 2000 MPa or more.

An example of steel used in the automotive industry is 22MnB5 steel. The composition of 22MnB5 is summarized below in weight percentages (rest is iron (Fe) and impurities):

| C | Si | Mn | P | S | Cr | Ti | B | N |
|---|---|---|---|---|---|---|---|---|
| 0.20-0.25 | 0.15-0.35 | 1.10-1.35 | <0.025 | <0.008 | 0.15-0.30 | 0.02-0.05 | 0.002-0.004 | <0.009 |

Several 22MnB5 steels are commercially available having a similar chemical composition. However, the exact amount of each of the components of a 22MnB5 steel may vary slightly from one manufacturer to another. In other examples the 22MnB5 may contain approximately 0.23% C, 0.22% Si, and 0.16% Cr. The material may further comprise Mn, Al, Ti, B, N, Ni in different proportions.

Usibor® 1500P commercially available from Arcelor Mittal, is an example of a commercially available steel used in tailored and patchwork blanks. Tailor (welded) blanks and patchwork blanks provide a blank with varying thickness or different material properties prior to a deformation process e.g. hot stamping. The thickness variation in a tailored blank is not to be confused with (local) reinforcement. Reinforcements in this sense instead are added to a component after a deformation process.

Usibor® 1500P is supplied in ferritic-perlitic phase. It is a fine grain structure distributed in a homogenous pattern. The mechanical properties are related to this structure. After heating, a hot stamping process, and subsequent quenching, a martensite microstructure is created. As a result, ultimate tensile strength and yield strength increase noticeably.

The composition of Usibor® is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Steel of any of these compositions (22MnB5 steels in general, and Usibor® in particular) may be supplied with a coating in order to prevent corrosion and oxidation damage. This coating may be e.g. an aluminum-silicon (AlSi) coating or a coating mainly comprising zinc or a zinc alloy.

The ultimate tensile strength of Usibor® after hot stamping and subsequent quenching (i.e. with a martensite microstucture) is 1.550 MPa±150, whereas the yield strength is around 1.150 MPa±150.

In a B-pillar, an important problem is to ensure that no deformation or little deformation occurs in the middle region, as intrusion may cause damage in the vehicle occupants. One solution is having a B-pillar with zones of different thickness. Particularly, a central region (around half the height of the B-pillar) may be stronger (i.e. thicker) to avoid the aforementioned intrusion but the overall weight is thereby increased.

Another solution consists in welding reinforcements, e.g. by spot welding, to strengthen the structure. Such reinforcements are usually made of steel and even if the material is not as stiff as the material of the B-pillar, the resulting structure after joining is strengthened by the extra material. But the use of reinforcements also involves a weight increment as extra material is added to the structure.

Keeping the weight of every component of the structural skeleton under control is important, as automotive companies try to maximize weight reduction as a heavier vehicle involves not only higher manufacturing costs but also increased fuel consumption, greater difficulty when accelerating, braking and/or turning due to the high inertia of a large mass.

In order to improve the ductility and energy absorption in key areas of a component, e.g. the lower part of the B-pillar, it is known to introduce softer regions within the same component. Soft zones can improve ductility locally while maintaining the required high strength overall. Additionally, the kinematics of deformation in the case of an impact or collision may be suitably tailored by including such soft zones.

Known methods of creating regions with increased ductility (soft zones) in vehicle structural components include the provision of tools comprising a pair of complementary upper and lower die units, each of the units having separate die elements (steel blocks). The die elements are designed to work at different temperatures, in order to have different cooling rates in different zones of the part being formed during the quenching process, and thereby resulting in different material properties in the final product (soft areas). Such methods are known as in-die controlled cooling processes.

The mentioned soft zones e.g. placed in the lower part of a B-pillar, may not resist large loads and the pillar may suffer a deformation which may lead to an intrusion of the central region of the B-pillar.

In conclusion, there is a need for optimizing/improving the mechanical behaviour of a B-pillar in crash events while at the same time reducing as much as possible the weight of the same pillar.

SUMMARY

In a first aspect, a B-pillar central beam made of steel comprising hard zones and soft zones which have a lower yield strength and/or tensile strength than the hard zones, an upper region with a fastening portion for fastening to a roof member, and a lower region with a fastening portion for fastening to a sill member is provided. The B-pillar central beam includes two soft zones. A lower soft zone is created between the lower fastening portion and the 50% of the B-pillar central beam height, and an upper soft zone is created between the upper fastening portion and the 50% of the B-pillar central beam height. The upper soft zone has a higher yield strength and/or tensile strength than the lower soft zone. The upper and lower fastening portions are predominantly hard zones.

The use of two soft zones, one in an upper half of the central beam and one in the lower half of the central beam may avoid intrusion of the central region (between 30 and 70% of the height) of the B-pillar central beam. The combination of two soft zones in combination with remaining hard zones i.e. central and upper and lower fastening portions, enables the displacement of the B-pillar substantially straight inwards, rather than an inclined inwards displacement in case a single lower soft zone is used. This can reduce injuries to the vehicle occupants.

Whereas for the lower soft zone an important requirement is the absorption of energy, for the upper soft zone the deformation trigger is more important. The upper soft zone can thus have higher mechanical strength. The higher mechanical strength means that given the same weight of material, higher loads can be withstood. The weight of the B-pillar may thus be optimized by having a higher grade or strength for the upper soft zone.

Higher mechanical strength for the upper soft zone in this respect is to be regarded as the upper soft zone having a higher yield strength and/or higher ultimate tensile strength than the lower soft zone. The yield strength and/or ultimate tensile strength of the upper soft zone will however still be lower than the corresponding strengths for the remainder of the B-pillars, i.e. the "hard zones" with martensitic microstructure.

Herein, "hard zone" is to be understood as a zone of the B-pillar central beam which primarily has a martensitic microstructure, and an ultimate tensile strength of approximately 1.400 MPa or more.

"Soft zone" is to be understood as a zone of the B-pillar central beam in which the steel has a less martensitic microstructure than a hard zone and an ultimate tensile strength of approximately 1.050 MPa or less. The microstructure of a soft zone may be, depending on the grade, e.g. a combination of bainite and martensite, of bainite, martensite and ferrite or of ferrite and perlite.

Using "soft zones" and "hard zones", the thickness of the B-pillar central beam may be kept constant or substantially constant along its height. The use of tailor welded blanks or tailor rolled blanks may be avoided or reduced.

In some examples, the lower soft zone is located between 3-50%, preferably between a 3-25%, of the B-pillar central beam height. Such position allows energy dissipation, and a deformation at a secure distance from vehicle occupants. The portion of the B-pillar which is to be attached at the sill member (or "rocker") is in this aspect maintained of high mechanical strength. At a height between 3-25% of the height of the B-pillar, the central B-pillar normally is of increased width. A soft zone in this area allows for high energy absorption.

According to a further example, the upper soft zone is located between 80-95%, preferably between an 85-95% B-pillar central beam height. A location for the upper soft zone in these ranges has been found advantageous as the resulting deformation of the B-pillar is such that intrusion towards a passenger is reduced as much as possible.

In some examples, the lower soft zone may have a yield strength of between 400-700 MPa. And in some examples, the upper soft zone may have a yield strength of between 550-800 MPa.

In some examples, the lower soft zone may have a height of 10-300 mm, preferably 30-300 mm, more preferably 30-200 mm. And in some examples, the upper soft zone may have a height of 10-150 mm, preferably 10-100 mm, more preferably 30-100 mm.

In some examples, a portion of the B-pillar comprising the upper soft zone has a substantially U-shaped cross-section, wherein the U-shape has a bottom wall and two side walls, and a lateral flange projecting outwardly at an end of each of the side walls. In some examples, the upper soft zone includes the bottom and at least a portion of the side walls.

In some examples, the upper soft zone may include the bottom and substantially the complete side walls. In some examples, the upper soft zone may comprise one or more of the lateral flanges.

In some examples, the B-pillar central beam has a substantially constant thickness.

In a second aspect, a method for manufacturing a B-pillar central beam. Firstly a B-pillar central beam having a height, a lower fastening portion and an upper fastening portion is formed is formed. Then, a lower soft zone and an upper soft zone according to any of the examples disclosed herein are created in the B-pillar central beam, and wherein the upper and lower fastening portions are predominantly hard zones.

In some examples, the lower soft zone may be created during the forming of the B-pillar central beam, including hot stamping and in-die controlled cooling. In alternative examples, the lower soft zone may be created by heating after the forming of the B-pillar central beam by hot stamping.

In some examples, the upper soft zone may be created by heating after the forming of the B-pillar central beam by hot stamping.

BRIEF DESCRIPTION OF THE DRAWINGS

Non-limiting examples of the present disclosure will be described in the following, with reference to the appended drawings, in which:

FIGS. 5a and 5b illustrate a lateral view of a B-pillar central beam comprising before and after a crash event according to an example.

DETAILED DESCRIPTION

Figure 1:
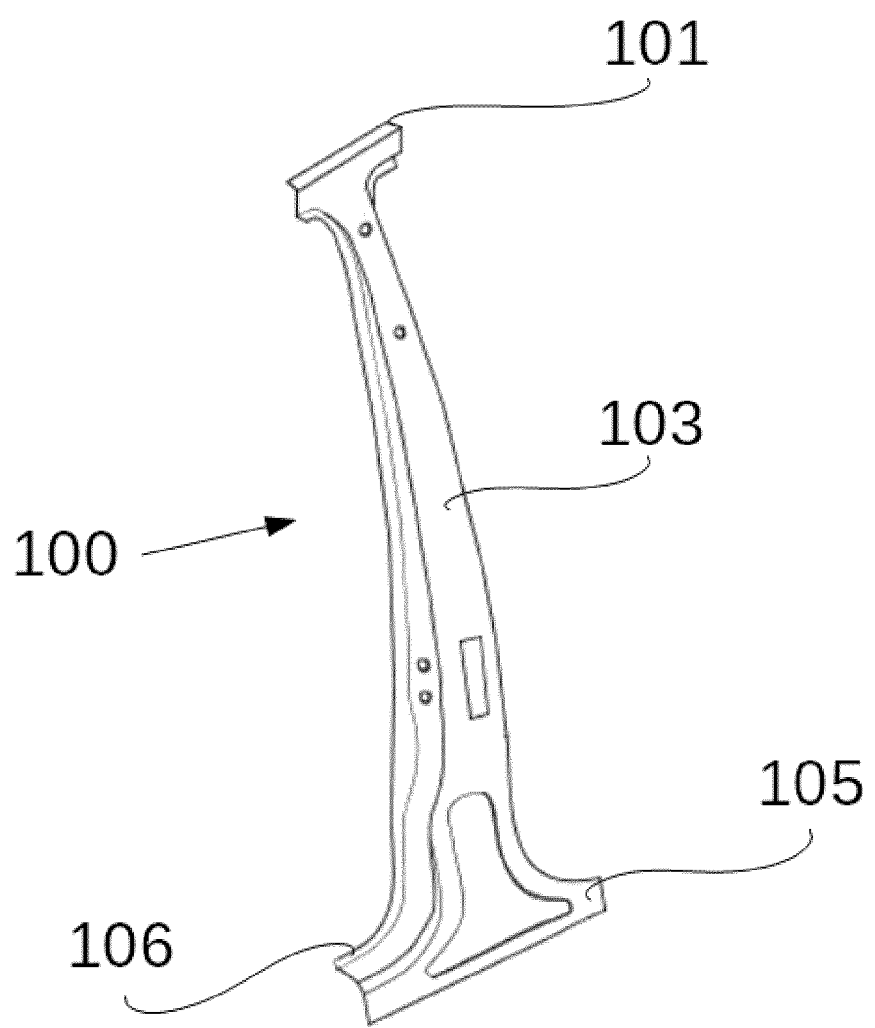
FIG. 1 illustrates a common B-pillar central beam.

FIG. 1 depicts a B-pillar central beam 100 which is, as a rule, welded to the rocker at the lower fastening portion 105, and to the roof panel of a vehicle, e.g. a car, in the upper fastening portion 101. The B-pillar is situated between the front and rear seats of the vehicle and it is useful too for different purposes. As said before, it gives structural support to the skeleton of the vehicle and provides a security barrier in a vehicle crash.

A B-pillar in some examples may comprise a central beam, an external plate and an internal plate, and optionally a further central reinforcement (central herein means in between the external and internal plate). The internal plate may serve for attaching parts to the interior of the vehicle, e.g. a car. The external plate may serve particularly for providing a complementary shape to a car door. Both an interior plate and an external plate, depending on the specific implementation, may contribute to the structural strength and stiffness of the resulting B-pillar.

Besides, a B-pillar central beam can also be used as mooring for many elements which are anchored in holes provided for each purpose. The B-pillar central beam 100 of FIG. 1 may comprise a hole to mount the anchor of the seatbelt, and another hole where a door lock is placed. A B-pillar central beam may further have fastening holes of different shapes and sizes e.g. to attach plastic furnishings or linings of the internal vehicle structures. FIG. 1 further depicts flanges 106 that project outwardly.

The central region 103 of the B-pillar central beam 100 between 30 and 70% of the height of the B-pillar plays an important role in a vehicle lateral crash. The impact may cause an intrusion in the structure which may be dangerous to vehicle occupants. It is therefore important to ensure that no deformation occurs in such central region 103.

Figure 2B:
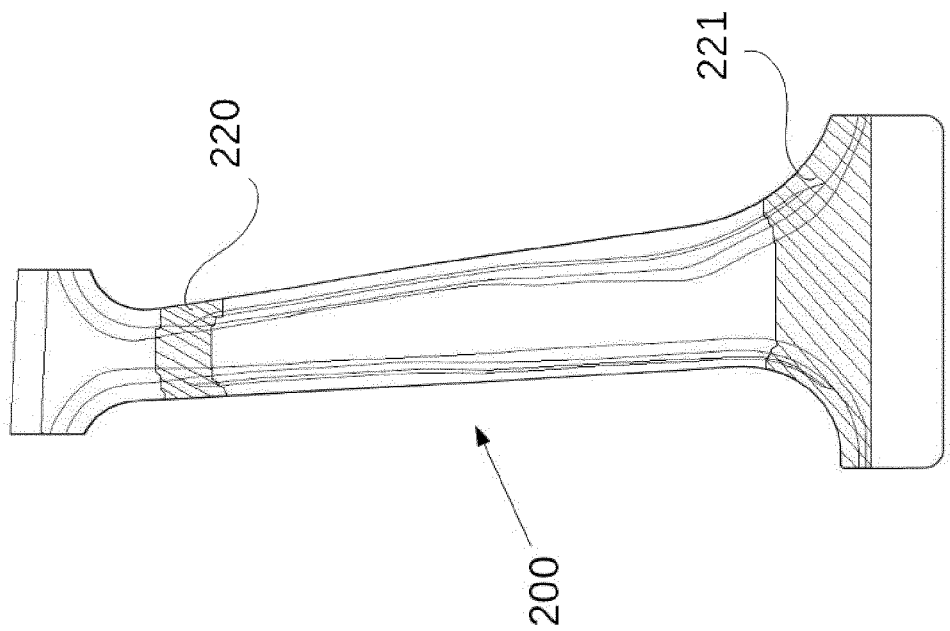
FIGS. 2a and 2b illustrate examples of a B-pillar central beam with two soft zones.
Figure 2A:
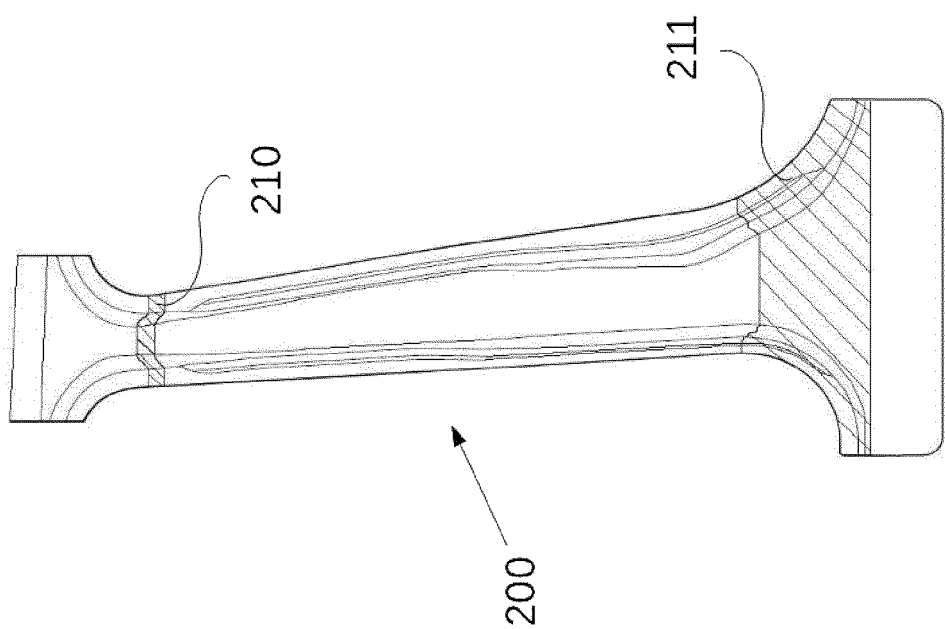

FIGS. 2a and 2b depict different examples of a B-pillar central beam comprising an upper soft zone 210, 220 and a lower soft zone 211, 221. A soft zone is a (steel blank) area for which the microstructure has been tailored to change the mechanical properties so as to increase ductility in that region. Characteristics of different examples of possible tailored areas are summarized below:

| Grade | Yield strength (MPa) | Ultimate tensile strength (MPa) | Hardness (HV) |
|---|---|---|---|
| HT 400 | 400 ± 50 | 600 ± 50 | 175-220 |
| HT 500 | 550 ± 50 | 750 ± 50 | 220-255 |
| HT 700 | 700 ± 50 | 900 ± 50 | 270-300 |
| HT 800 | 800 ± 50 | 1000 ± 50 | 300-330 |
| Usibor ® 1500 (martensite) | 1150 ± 150 | 1550 ± 150 | 450-500 |

HT 400, HT 500, HT 700, HT 800 are different grades of steels commercially offered by Gestamp®.

Soft zones according to examples of present disclosure may have different grades or yield strengths to control the deformation on the B-pillar central beam. The grade of the upper soft zone may be higher than the grade of lower soft zone. Different examples of possible grade combinations for the higher and lower soft zones are summarized below:

| Lower soft zone yield strength (MPa) | Upper soft zone yield strength (MPa) |
|---|---|
| 400 ± 50 | 550 ± 50 |
| 400 ± 50 | 700 ± 50 |
| 400 ± 50 | 800 ± 50 |
| 550 ± 50 | 700 ± 50 |
| 550 ± 50 | 800 ± 50 |
| 700 ± 50 | 800 ± 50 |

According to examples of present disclosure, the already mentioned two soft zones may have different heights. The lower soft zone may have a height between 10-300 mm, preferably 30-200 and more preferably, a height of 30-200 mm. On the other hand, the upper soft zone may have a height between 10-150 mm, preferably of 10-100 mm and more preferably, a height of 30-100 mm. The aim of the upper soft zone is not primarily energy dissipation and so, it does not necessarily be as wide/high as lower soft zone.

FIG. 2a depicts an example of a front view of a B-pillar central beam 200 with an upper soft zone 210 with a yield strength of 550 MPa and a lower soft zone 211 that is substantially wider than the upper soft zone 210 (in other words: the lower soft zone has an increased height) which has a yield strength of 400 MPa.

In FIG. 2b, a front view of a B-pillar 200 central beam with an upper soft zone 220, which has more height that the soft zone 210 shown in FIG. 2a, and a lower soft zone 221 are shown. In the example of FIG. 2b, the yield strengths differ from the example of FIG. 2a, upper soft zone 221 has a yield strength of 800 MPa while lower soft zone has a yield strength of 700 MPa.

Such mentioned soft zones may be created in different regions of the B-pillar central beam. A lower soft zone may be created between the lower fastening portion and the 50% of the B-pillar central beam height, between a 3-50% of the B-pillar central beam height, more preferably between a 3-25% of the B-pillar central beam height. An upper soft zone may be created between the upper fastening portion and the 50% of the B-pillar central beam height, between an 80-95% of the B-pillar central beam height, preferably between an 85-95% of the B-pillar central beam height.

Soft zones may be created in steel blanks by different techniques such as in-die controlled cooling or laser heating after a deformation process.

Soft zones according to examples of present disclosure may be formed during a hot stamping process by in-die controlled cooling particularly when the soft zones have a significant surface. The dies used in a (hot) deformation process may comprise a number of different die blocks. In order to create a soft zone, the temperature in one of such die blocks may be controlled to be different than the temperature of another die block. When soft zones are created during the hot deformation process, the soft zones may preferably correspond to at least the surface of such a die block. A soft zone formed in this manner may thus have a lower limit of a height of at least 30 mm.

Soft zones according to another example may be created after a stamping process e.g. cold or hot stamping, using e.g. laser heating. Laser heating processes use a laser beam to heat a work piece, e.g. a metal blank, to change its microstructure and therefore its mechanical properties.

Laser heating techniques requires a minimum width of 10 mm. Laser heating may also be used to create greater areas but it may involve a high time consumption. Laser heating is therefore more focused on the creation of small soft zones.

According to a further example, and depending of the width of each soft zone, a different technique may be used in the creation of each soft zone. A soft zone e.g. a lower soft zone, may be created by in-die controlled cooling and once the steel blank e.g. a B-pillar central beam, is manufactured, a laser heating technique or e.g. induction heating may be used to create (at least) a soft zone e.g. an upper soft zone.

Figure 3:
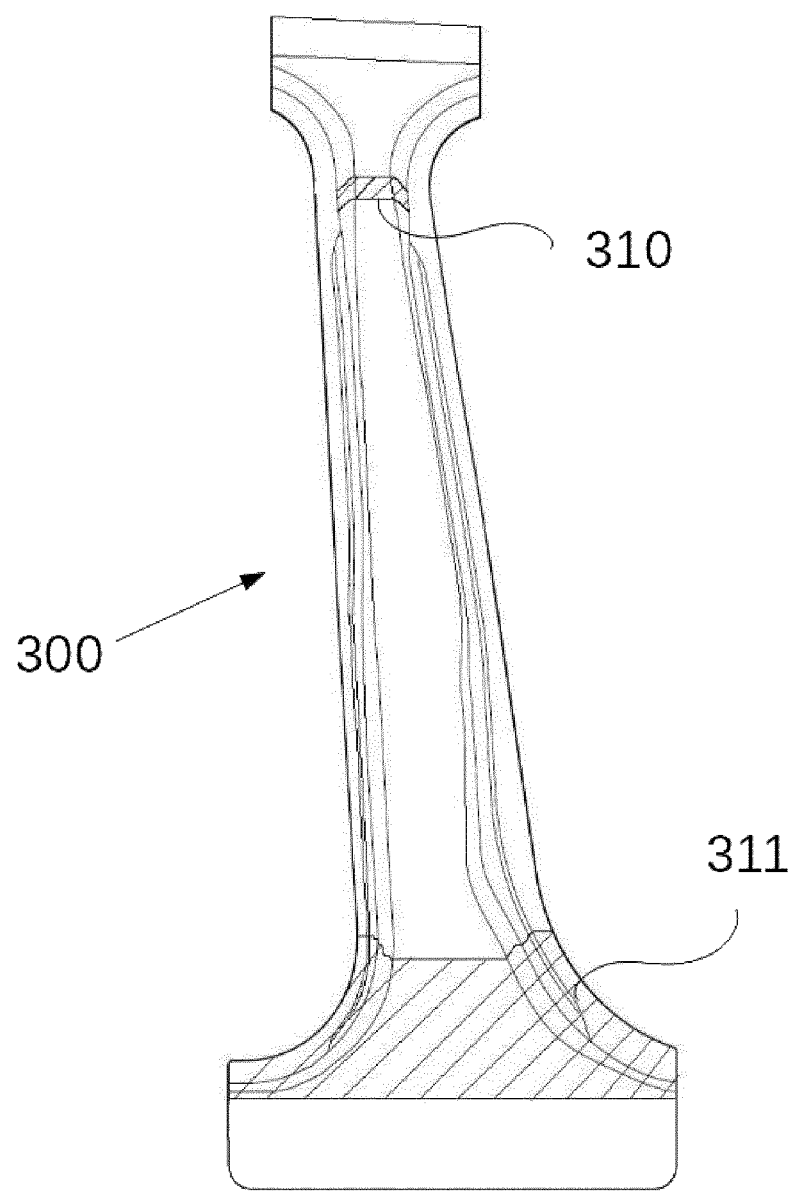
FIG. 3 illustrates a B-pillar central beam with a soft zone which does not cover the entire width of the B-pillar.

FIG. 3 shows a front view of a B-pillar central beam 300 with two soft zones 310, 311. The lower soft zone 311 covers the entire width of the B-pillar central beam 300 while the upper soft zone 310 covers only a portion of the width of the B-pillar central beam 300.

FIGS. 4a-4d schematically depict different examples of cross-sections of a portion of a B-pillar having a soft zone according to examples of the present disclosure. Such a soft zone may preferably be the upper soft zone.

Figure 4A:
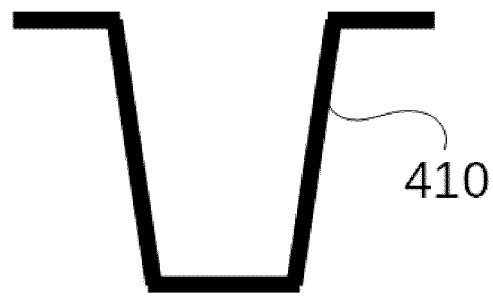
FIGS. 4a-4d illustrate U-shape cross-sections of portions of a B-pillar with different configurations for a soft zone according to examples.
Figure 4B:
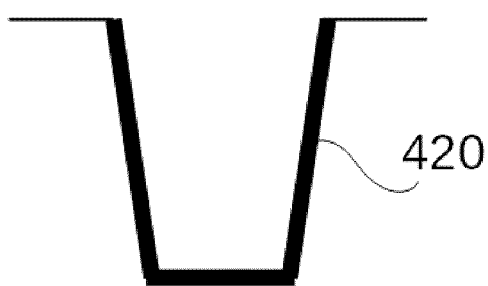
Figure 4C:
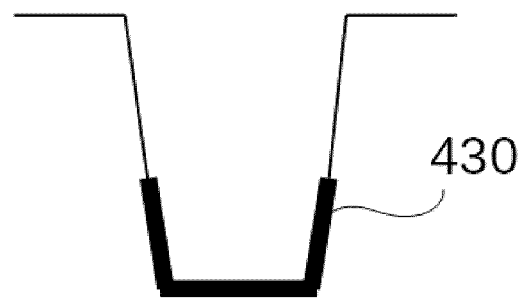
Figure 4D:
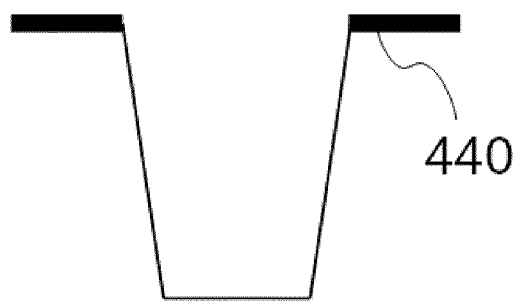

FIG. 4a shows a soft zone 410 which covers the entire U-shaped cross-section and the flanges of a portion of a B-pillar central beam. FIG. 4b shows a cross-section in which the soft zone 420 comprises the bottom wall and substantially the complete side walls of the U-shape. FIG. 4c depicts the cross-section of a soft zone 430 which comprises the bottom wall and a portion of the side walls of the U-shape. FIG. 4d depicts a cross-section of a soft zone 440 which comprises both lateral flanges.

The main goal of the upper soft zone in these examples is to influence the deformation kinematics, rather than the local absorption of energy in case of a collision. It has been found that in order to steer the deformation, it can be sufficient to have a soft zone extend only over a part of the width of the local cross-section of the B-pillar. The overall strength of the B-pillar can thus be higher in these cases than in cases wherein the soft zone extends over the entire local width.

In some of these examples, the soft zone may be substantially symmetric with respect to the longitudinal axis of the B-pillar. In some examples, the soft zone may be split in two separate parts (mainly in the lateral flanges).

Figure 5A:
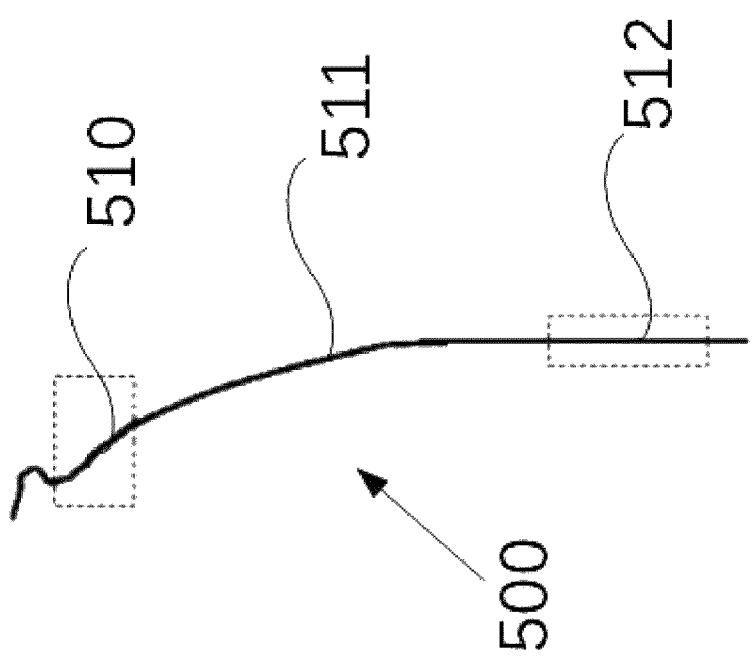

FIG. 5a schematically depicts a lateral view of a B-pillar central beam 500 before a crash event according to an example. The B-pillar central beam 500 comprises a central region 511 and two soft zones 510, 512. The upper soft zone 510 improves the cinematic behavior of the structure while the lower soft zone 512 enables energy dissipation.

FIG. 5b shows a lateral view of a B-pillar central beam 500 after a crash event according to an example. After a lateral crash, the main deformation is located at the lower soft zone 522 as a result of energy dissipation, while upper soft zone 520 has suffered a small deformation. As a result no intrusion or deformation or very little has occurred in the central region 521 of the B-pillar central beam 500.

Figure 6:
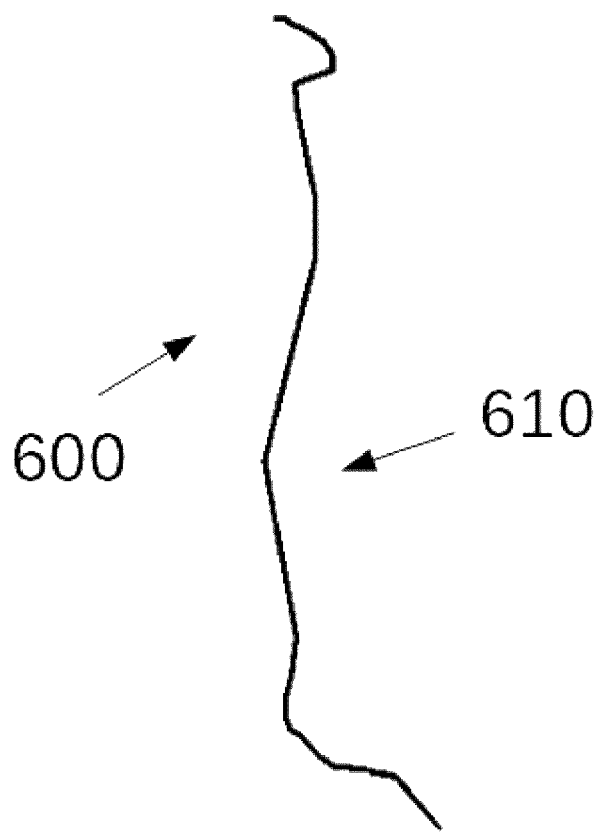
FIG. 6 illustrates a lateral view of a B-pillar central beam before a crash event according to a prior art arrangement.

FIG. 6 shows a lateral view of a B-pillar central beam 600 after a crash event according to a prior art arrangement with only a lower soft zone. Contrary to FIG. 5b, in which the B-pillar central region remains without intrusion, the B-pillar central beam 600 of FIG. 6 has suffered an intrusion 610 in its central region. This is due to an inclination of the lower portion of the B-pillar central beam, wherein the soft zone works as a "hinge" for the deformation.

In this sense, in FIG. 5b it may be seen that two of such "hinges" are provided, whereas a central portion of the beam remains straight.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A B-pillar central beam made of a material comprising steel, comprising:
   hard zones and soft zones, wherein the soft zones have (i) a lower yield strength, or (ii) a lower tensile strength, or (iii) both a lower yield strength and a lower tensile strength than the hard zones,
   an upper region with an upper fastening portion for fastening to a roof member and a lower region with a lower fastening portion for fastening to a sill member, and including
   a lower soft zone between the lower fastening portion and 50% of the B-pillar central beam height, and
   an upper soft zone between the upper fastening portion and the 50% of the B-pillar central beam height, wherein
   the upper soft zone has a higher yield strength, or (ii) a higher tensile strength, or (iii) both a higher yield strength and a higher tensile strength than the lower soft zone and wherein the upper and lower fastening portions are predominantly hard zones.

2. The B-pillar central beam according to claim 1, wherein the lower soft zone has a yield strength of between 400-700 MPa.

3. The B-pillar central beam according to claim 1, wherein the upper soft zone has a yield strength of between 550-800 MPa.

4. The B-pillar central beam according to claim 1, wherein the lower soft zone is located between 3-50% of the height of the B-pillar central beam.

5. The B-pillar central beam according to claim 1, wherein the upper soft zone is located between 80-95% of the height of the B-pillar central beam.

6. The B-pillar central beam according to claim 1, wherein the lower soft zone has a height of 10-300 mm.

7. The B-pillar central beam according to claim 1, wherein the upper soft zone has a height of 10-150 mm.

8. The B-pillar central beam according to claim 1, wherein a portion of the B-pillar comprising the upper soft zone has a substantially U-shaped cross-section, wherein the U-shape has a bottom and two side walls, and a lateral flange projecting outwardly at an end of each of the side walls.

9. The B-pillar central beam according to claim 8, wherein the upper soft zone includes the bottom and at least a portion of the side walls.

10. The B-pillar central beam according to claim 9, wherein the upper soft zone includes the bottom and substantially the complete side walls.

11. The B-pillar central beam according to claim 8, wherein the upper soft zone comprises one or more of the lateral flanges.

12. The B-pillar central beam according to claim 1, having a substantially constant thickness.

13. A method for manufacturing a B-pillar central beam, the method comprising:
   forming a B-pillar central beam having a height, a lower fastening portion and an upper fastening portion,
   creating a lower soft zone between the lower fastening portion and 50% of the B-pillar central beam height,
   creating an upper soft zone between the upper fastening portion and 50% of the B-pillar central beam height, wherein
   the upper soft zone has a higher mechanical strength than the lower soft zone, and wherein the upper and lower fastening portions are predominantly hard zones.

14. The method of claim 13, wherein the lower soft zone is created during the forming of the B-pillar central beam, including hot stamping and in-die controlled cooling.

15. The method of claim 13, wherein the lower soft zone is created by heating after the forming of the B-pillar central beam by hot stamping.

16. The method according to claim 13, wherein the upper soft zone is created by heating after the forming of the B-pillar central beam by hot stamping.

* * * * *